United States Patent [19]

Graham

[11] Patent Number: 5,361,877
[45] Date of Patent: Nov. 8, 1994

[54] DIAPHRAGM-TYPE PNEUMATIC BRAKE ACTUATOR WITH CLOSING VALVE

[76] Inventor: John M. Graham, 930 Peninsula Ave. #205, San Mateo, Calif. 94401

[21] Appl. No.: 88,477

[22] Filed: Jul. 7, 1993

[51] Int. Cl.⁵ .................................... F16D 65/24
[52] U.S. Cl. ................... 188/170; 303/84.1; 137/519.5
[58] Field of Search ............ 303/7, 9, 9.76, 84.1, 303/901, 9.67; 188/170; 137/519.5; 91/468

[56] References Cited

U.S. PATENT DOCUMENTS

| | | | |
|---|---|---|---|
| 2,058,595 | 10/1936 | Klein | 303/84 |
| 2,169,462 | 8/1939 | DeGrace | 303/84 |
| 2,195,214 | 3/1940 | Jacob | 303/84 |
| 2,231,942 | 2/1941 | O'Dowd | 303/84 |
| 2,265,117 | 12/1941 | Seymour | 303/84 |
| 2,322,658 | 6/1943 | Overbeke | 137/166 |
| 2,691,385 | 10/1954 | Budd | 137/399 |
| 2,809,723 | 10/1957 | Howze | 188/170 X |
| 2,931,178 | 4/1960 | Straus | 60/50.4 |
| 2,939,475 | 6/1960 | Roach | 137/155 |
| 2,948,147 | 7/1965 | Sauer et al. | 137/519.5 X |
| 3,177,779 | 4/1965 | Dobrikin et al. | 92/63 X |
| 3,406,713 | 10/1968 | Borch | 137/498 |
| 3,554,331 | 1/1971 | Pollinger | 188/170 X |
| 3,830,252 | 8/1974 | Follett | 137/519.5 |
| 3,941,145 | 3/1976 | Morain | 137/318 |
| 4,005,724 | 2/1977 | Courtot | 137/38 |
| 4,589,704 | 5/1986 | Graham | 303/13 X |
| 4,749,236 | 6/1988 | Graham | 303/9.76 X |
| 5,255,961 | 10/1993 | Graham | 188/170 X |

FOREIGN PATENT DOCUMENTS

| | | | |
|---|---|---|---|
| 0950251 | 10/1956 | Germany | 137/519.5 |
| 1230717 | 5/1971 | United Kingdom | 137/519.5 |
| 1233846 | 6/1971 | United Kingdom . | |
| 2017241 | 10/1979 | United Kingdom . | |

OTHER PUBLICATIONS

Bendix Westinghouse Limited, "Quick Release Valve" Technical Pamphlet 10/008, Issue 3, May 1976.

*Primary Examiner*—Robert J. Oberleitner
*Assistant Examiner*—Peter M. Poon
*Attorney, Agent, or Firm*—Graham & James

[57] ABSTRACT

A diaphragm-type pneumatic brake actuator is provided with a closing valve that seals the air pressure line upstream from the diaphragm in response to diaphragm rupture. This isolates the actuator from the pressure line so that the line does not lose pressure and, thus, prevents a diaphragm rupture in one brake actuator from adversely affecting another brake actuator coupled to the same air pressure line.

16 Claims, 3 Drawing Sheets

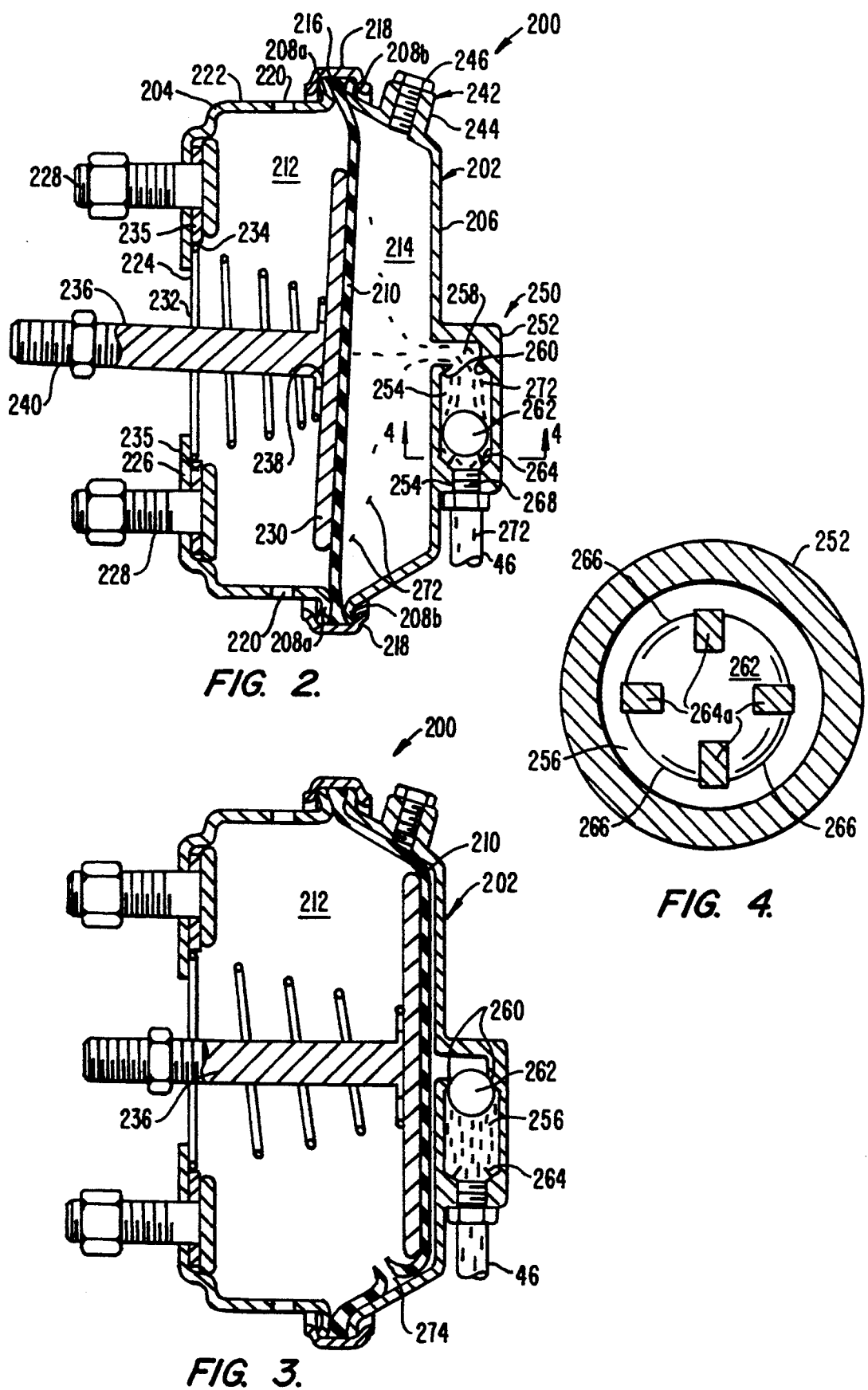

1

DIAPHRAGM-TYPE PNEUMATIC BRAKE ACTUATOR WITH CLOSING VALVE

BACKGROUND OF THE INVENTION

The present invention relates to brake actuating systems generally, and more particularly to a diaphragm-type pneumatic brake actuator having a closing valve.

It has long been recognized that when wheels for a vehicle skid during a sudden stop, the operator of the vehicle can lose much control. To prevent this, computerized anti-lock braking systems have been developed and are provided as optional or standard equipment on commercially available vehicles. These anti-lock braking systems sense when one or more of the wheels starts slowing down too rapidly, which indicates that the wheels are about to lock up and cause skid resulting in loss of operator control. Responsive to this sensed condition, the computerized anti-lock braking system controls the braking force, through hydraulic fluid or air pressure, to prevent the wheel(s) from locking up and to ensure maximum traction and control for a safe, controlled stop.

Although anti-lock brake systems prevent wheel lock-up and, thus, skidding, they generally do not compensate for other types of brake failure. For example, they do not resolve the problem of diaphragm rupture in a diaphragm-type pneumatic brake actuator which in addition to causing braking capacity loss for the wheel associated with the damaged actuator, can result in the loss of braking capacity for other wheels of the vehicle. That is, when the diaphragm in a diaphragm-type pneumatic brake actuator ruptures, pressurized air rushes through the resultant opening. This can lower the air pressure in the air pressure supply line coupled to the damaged actuator to the extent that another air brake actuator also supplied by that line is rendered nonfunctional.

SUMMARY OF THE INVENTION

The present invention is a result of the recognition that it is desirable to have protection against diaphragm failure in vehicles having diaphragm-type pneumatic brake actuators, including vehicles having anti-lock brake systems.

One way to achieve this protection is through the use of separate brake line systems for each wheel. For example, instead of using a tandem master cylinder, a pair of tandem master cylinders could be used, one for each axle on a conventional automobile. However, such duplication of equipment raises the cost, complexity and weight of the vehicle and is therefore best avoided.

The present invention is directed to a system for protecting against diaphragm failure in diaphragm-type pneumatic brake actuators that avoids the problems and disadvantages of the prior art. The invention accomplishes this goal by providing a diaphragm-type pneumatic brake actuator having a mechanism associated therewith for sealing the pneumatic line upstream from the diaphragm in response to diaphragm rupture. Thus, in cases where two brake actuators are both coupled to a single air pressure line, for example, the invention prevents a diaphragm rupture in one pneumatic brake actuator from affecting the other pneumatic brake actuator coupled to the same line. This is especially advantageous when used in conjunction with anti-lock brake systems. Without anti-lock braking systems, if one were to lose the brake on one wheel due to a diaphragm rupture in the pneumatic actuator associated with that brake, but maintain braking power on the other wheel on the same axle due to the sealing mechanism of the present invention, the other wheel could lock-up and cause the vehicle to become uncontrollable. However, when the actuator and sealing mechanism discussed above are used in conjunction with an anti-lock brake system, the anti-lock brake system prevents the wheel associated with the functional brake actuator from locking up so that it can be used to help stop the vehicle in a controlled manner. Thus, Applicant has recognized that wheel-by-wheel brake failure protection in combination with an anti-lock brake system provides additional advantages.

The sealing mechanism preferably comprises a closing valve that is either formed integrally with the pneumatic brake actuator or is coupled thereto. The closing valve normally permits free flow of fluid through its inlet and outlet ports and into the brake actuator. However, when a rupture in the actuator diaphragm occurs, the valve automatically seals the brake line to that actuator. This sealing automatically takes place by virtue of the flow of fluid through the closing valve and into the defective brake actuator at a rate substantially higher than normal as a result of the rupture. Thus, the rupture does not adversely affect another pneumatic brake actuator fed by the same source line.

In the preferred embodiment, the pneumatic brake actuator includes a diaphragm that divides the interior of the actuator housing into first and second compartments. An actuator member extends through the housing and into the first compartment where the actuator member is coupled to and biased toward the diaphragm. The closing valve, which is fluidly coupled to the second compartment, includes a valve body that defines a valve chamber and first and second ports fluidly coupled to one another through the valve chamber. The first port is adapted to be coupled to a source of pressurized fluid and the second port is fluidly coupled to the second compartment. In this way, pressurized fluid can be introduced through the closing valve and into said second compartment to displace the diaphragm which, in turn, displaces the actuator member to actuate a brake.

A valve element, which preferably is a spherical ball, is disposed in the valve chamber and is movable between a first position, where the element is seated against a first valve seat that is adjacent the first port and permits fluid flow therethrough when the valve element is seated thereagainst and a second position, where the valve element is seated against a second seat that is adjacent the second port and forms a seal with the valve element to seal the valve chamber from the second compartment of the actuator. The valve element is gravity biased toward the first seat. In addition, the valve element is dimensioned to provide sufficient clearance between the valve element and the inner walls of the valve chamber so as not to interfere with normal brake operation. However, if the diaphragm ruptures, the resultant increased fluid flow rate causes the valve element to overcome the gravitational bias and move to the second position where the valve element seals the closing valve and prevents further loss of pressurized fluid.

Another advantageous feature of the invention is that the closing valve preferably is constructed to eliminate the need for mechanical springs. The closing valve preferably is oriented generally vertically with the force of gravity normally maintaining the valve element biased toward the first seat of the closing valve. Only when the fluid flow through the closing valve toward the brake is high enough to cause the force of gravity to be overcome will the closing valve stop fluid from flowing to the actuator. The use of gravity as the biasing force on the sealing element eliminates the problems inherent with mechanical springs. That is, manufacturing tolerances which result in differing spring constants and different initial biasing forces are eliminated since gravity is a constant. The size and weight of the sealing element can be inexpensively controlled to very close tolerances so that any variations do not produce measurable differences in the operation of the valve.

The above is a brief description of some deficiencies in the prior art and advantages of the present invention. Other features, advantages and embodiments of the invention will be apparent to those skilled in the art from the following description, accompanying drawings and appended claims.

BRIEF DESCRIPTION OF THE DRAWINGS

FIG. 2 is an enlarged sectional view of one embodiment of the diaphragm-type air brake actuator and closing valve combination schematically shown in FIG. 1, with the closing valve in the open position;

FIG. 3 shows the actuator and closing valve of FIG. 2 with the diaphragm ruptured and the valve in the closed position;

FIG. 4 is a sectional view of the closing valve taken along line 4—4 in FIG. 2;

DESCRIPTION OF THE PREFERRED EMBODIMENT

Figure 1:
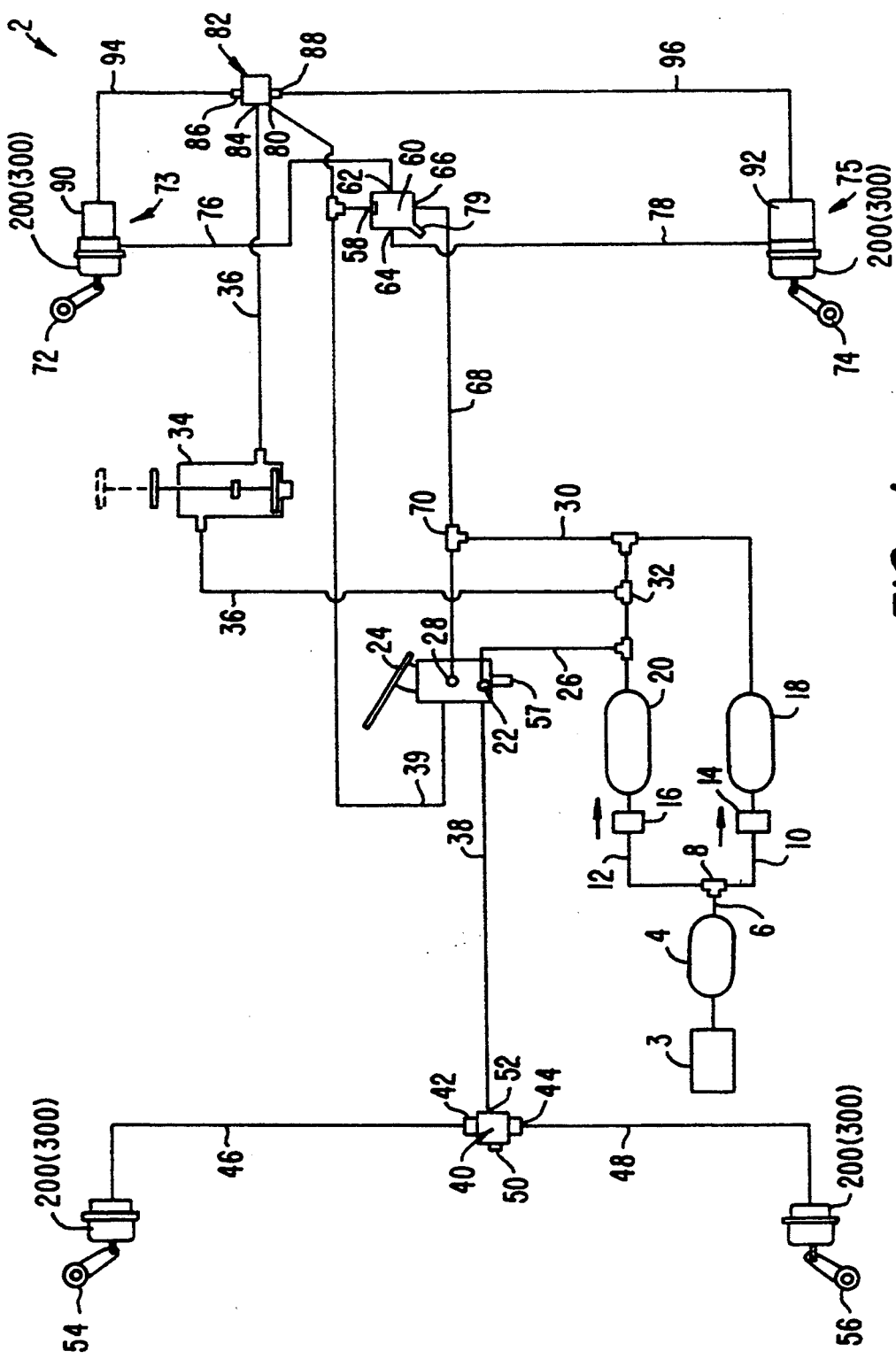
FIG. 1 is a schematic representation of the diaphragm-type air brake actuator and closing valve combination according to the principles of the present invention integrated into a conventional air brake system for a truck.

Referring to the drawings in detail, wherein like numerals indicate like elements, a diaphragm-type pneumatic brake actuator is shown in accordance with the present invention. Although the invention will be described in conjunction with the conventional truck air brake system 2 schematically illustrated in FIG. 1, it should be understood that it can be used with other brake systems as will be apparent to one skilled in the art.

Referring to FIG. 1, system 2 includes compressed air source 3 which supplies compressed air to primary tank 4. Compressed air in tank 4 is pumped through output line 6, Tee 8, lines 10, 12, and check valves 14, 16 to pressurize secondary tanks or reservoirs 18 and 20. Secondary reservoir 20 is connected to first inlet 22 of pedal valve 24 by line 26. Pedal valve 24 also includes a second inlet 28 coupled to secondary reservoir 18 through line 30. Lines 26 and 30 are coupled to one another through a two-way check valve 32. Two-way check valve 32 permits pressurized air to be provided to parking brake actuator 34 (discussed below) through line 36. In the event air pressure is lost along either line 26 or 30, two-way check valve 32 seals the passage to that line while permitting pressurized air to be continuously supplied along line 36.

When an operator actuates pedal valve 24, compressed air is supplied along lines 38, 39. Supply line 38 is coupled to inlet 52 of quick release valve 40. Quick release valve 40 includes outlets 42, 44 connected to brake lines 46, 48 and exhaust port 50 open to the atmosphere. Pressurizing line 38 pressurizes lines 46, 48 and, thus, pressurizes pneumatic actuators 200 (300) (discussed in more detail below) which, in turn, actuates air brakes 54, 56. When the operator releases pedal valve 24, air in line 38 is exhausted through an exhaust port 57 of pedal valve 24. This drops the air pressure at port 52 which permits air in lines 46, 48 to be exhausted through exhaust port 50. Thus, quick release valve 40 acts as a Tee connection for lines 38, 46, 48 and permits the air from the air brake actuators to be exhausted through their brake lines 46, 48 much more quickly than if the air had to travel through line 38 as well.

Assuming parking brake actuator 34 is in its solid line position (flow-through condition) pressurization of line 39 pressurizes control port 58 of relay valve 60. Relay valve 60 includes a pair of line ports 62, 64 and source port 66. Source port 66 is connected to line 30 through line 68 and Tee 70. Line ports 62, 64 are coupled to air brake actuators 200 (300) which actuate air brakes 72, 74. Air brakes 72, 74 operate similarly to air brakes 54, 56. (Air brake actuators 200 (300) are part of dual chamber brake systems 73, 75 which also include spring brake actuators 90, 92, discussed below.) Applying pressure to control port 58 connects source port 66 in line ports 62, 64, thus allowing pressurized air to pass from primary reservoir 18, along lines 30, 68, through relay valve 60, through line ports 62, 64, and brake lines 76, 78 and finally to air brake actuators 200 (300). When the operator releases pedal valve 24, pressurized air in line 39 is exhausted through exhaust port 57 thus reducing the pressure at control port 58. This causes relay valve 60 to exhaust the air within lines 76, 78, and actuator 200 (300) through exhaust port 79 of relay valve 60.

Dual chamber brake systems 73, 75 are not designed to simultaneously apply braking force from air brake actuators 200 (300) and spring brake actuators 90, 92. Doing so could damage the brake components or split the brake drum. To prevent the simultaneous actuation of the air spring brake actuators, line 39 is connected to a first source port 80 of a combination quick release/anti-compounding valve 82. Valve 82 includes a second source port 84 connected to line 36, and a pair of line ports 86, 88. Line ports 86, 88 are connected to spring brake actuators 90, 92 by spring brake lines 94, 96. Spring brake actuators 90, 92 are a conventional type which cause the brakes to actuate under mechanical spring force when compressed air is not applied along lines 94, 96. Valve 82 is constructed so that when high pressure is applied to either first or second source ports 80, 84, the spring brake lines 94, 96 are pressurized, thus preventing spring brake actuators 90, 92 from applying a mechanical braking force to the brakes. This occurs whenever pedal valve 24 is depressed and while parking brake valve 34 remains in its flow-through condition, shown in solid lines in FIG. 1. In this manner, the force of spring brake actuators 90, 92 is applied only when air brake actuators 200 (300) are not actuated to prevent unwanted compounding of brake force.

Referring to FIGS. 2 and 3, a first embodiment of the pneumatic service brake actuator 200 is shown in accordance with the principles of the present invention. The actuator includes a conventional service brake housing 202 having first and second cup-shaped portions 204, 206 having respective flanges 208a, b that extend around the perimeter thereof. Diaphragm 210, which preferably comprises a polymeric material such as rubber, is positioned within housing 202, as is conventional in the art, to divide the interior of housing 202 into first and second compartments 212,214. Specifically, diaphragm 210 includes a marginal portion 216 that is positioned between flanges 208a, b. The thickness of the diaphragm is such that when clamp ring 218 is secured about flanges 208a, b diaphragm 210 and housing 202 form a fluid seal between first and second compartments 212, 214. In addition, the shape of diaphragm 210 is selected to correspond with the configuration of housing 202 and flanges 208a, b to ensure a complete seal. Thus, when housing 202 and flanges 208a, b are annular, for example, an annular diaphragm is selected so that a 360° seal is formed.

First shaped portion 204 includes vent openings 220, which are formed through its side wall 222, and push-rod receiving opening 224 formed through the end wall 226 of portion 204. First portion 204 also is provided with fasteners, such as threaded nut-bolt fasteners 228, that extend through end wall 226 for securing the pneumatic service brake actuator 200 to a conventional brake such as brake 54. A pressure distributing plate 230 is biased against diaphragm 210 by return spring (coil spring) 232 as is conventional in the art. As illustrated in FIGS. 2 and 3, one end of return spring 232 abuts against pressure distributing plate 230 and the other end of return spring 232 abuts the inner surface of end wall 226 and is maintained centered about opening 224 by the inner wall 234 of annular plate 235. Fasteners 228 extend through holes in annular plate 235 to maintain plate 235 in the desired position as shown in FIGS. 3 and 4. Push-rod (brake actuating member) 236 extends through opening 224 and through return spring 232 in first compartment 212. Push-rod 236 includes a flange portion 238 which is secured to pressure distributing plate 230, such as by welding, or is integrally formed with the plate. Push-rod 236 is maintained in the central position shown in FIGS. 2 and 3 through the interconnection between its threaded portion 240 and the corresponding portion of the brake associated therewith, such as brake 54, as is conventional in the art.

Second cup-shaped portion 206 includes a second compartment access port 242 and a closing valve 250 integrally formed with portion 206. Access port 242 comprises a threaded cylindrical portion 244 and cooperating threaded bolt or plug element 246. Valve 250 includes a valve body 252 that defines inlet port 254, valve chamber 256 and outlet port 258, all of which are in fluid communication with one another. At the upper end of valve chamber 256 is upper valve seat 260, which has a sealing surface configured to form a seal with valve element 262, which preferably is in the form of a spherical ball. Specifically, when valve element 262 is seated against upper seat 260, fluid is prevented from entering outlet port 258 from valve chamber 256 as shown in FIG. 3.

Lower valve seat 264 is positioned at the lower end of valve chamber 256 and comprises a plurality of circumferentially spaced segments 264a forming apertures or fluid passages 266 therebetween (FIG. 4). In this manner, fluid can flow through valve seat 264 when valve element 262 is seated thereagainst. In addition, the spherical valve element 262 illustrated in FIGS. 2 and 3 has a diameter less than the diameter of valve chamber 256 so that fluid entering the valve chamber and passing through passageways 266 can flow around the valve element to outlet port 256 and into second compartment 214 to displace diaphragm 210 and push-rod 236. A conventional threaded coupling 268 couples a pressure line, such as brake line 46, to closing valve 250 so that pressurized fluid can be introduced into second compartment 214 of the service brake actuator. Preferably, the path between the lower and upper valve seats is vertical to enhance the biasing effect and prevent undesirable valve movement. As shown in FIGS. 2 and 3, inlet port 254 and lower valve seat 264 are at an elevation below upper valve seat 260 and outlet port 258. In this way, valve element 252 is gravity biased against lower valve seat 264.

The operation of actuator 200 will be described with reference to the braking system illustrated in FIG. 1 for purposes of example. When an operator depresses, brake pedal 24 pressurized fluid flows through lines 38, 46 and 48 into inlet ports 254 of the actuator closing valves coupled to lines 46 and 48. To avoid unnecessary repetition, description of a single actuator will be made with reference to the actuator coupled to air brake 54 and FIG. 2 and 3. Pressurized fluid, generally designated with reference numeral 272, enters closing valve 200 through inlet port 254, travels between lower valve seat segments 264a, around valve element 252, and then passes through outlet port 258 and into second compartment 214 where the pressurized fluid effectively displaces diaphragm 210 and, thus, moves push-rod 236 forward to actuate air brake 54. Valve element 258 is gravity biased toward lower valve seat 262 and remains seated thereagainst when the fluid flow rate through the closing valve is insufficient to make element 258 overcome gravitational forces. However, if diaphragm 210 ruptures, as shown in FIG. 3, and generally designated with reference numeral 274, the fluid flow rate substantially increases as fluid surges through rupture 274 such that the pressurized fluid forces valve element 252 upwardly and against upper seat 260 where the valve element and cooperating surface of the upper valve seat 260 form a seal, thereby cutting off all fluid flow from the valve chamber to the outlet port and into second compartment 214 of the actuator. Thus, in response to the rupture of diaphragm 210, valve element 262 rises to seat against upper valve seat 260, and prevents fluid and pressure loss through the actuator associated with brake 54 so that sufficient pressure remains available through brake line 48 to effectively operate the service brake actuator associated with brake 56 at the other end of the axle. The closing valve thus prevents the brake system from losing air pressure due to the rupture of a diaphragm in a pneumatic service brake actuator. That is, the closing valve isolates that service brake actuator from the vehicles brake system so that another brake coupled to the same pressure line can function properly.

Figure 5:
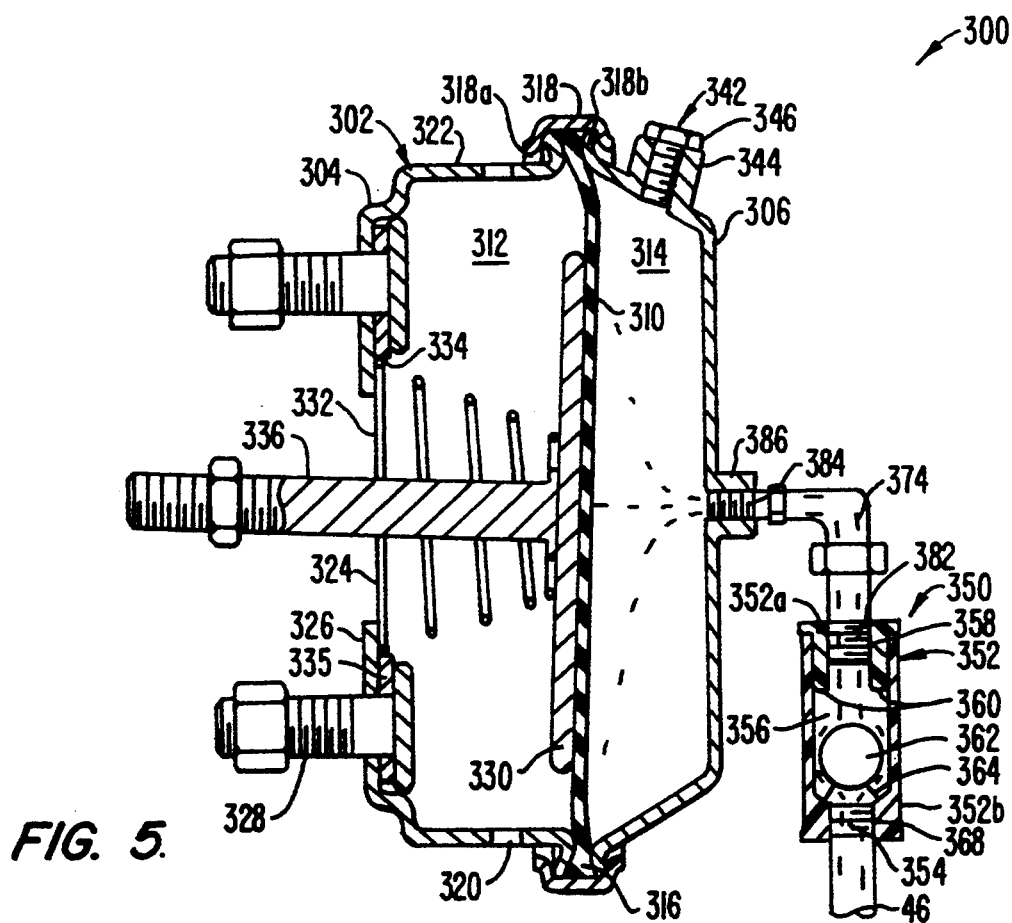
FIG. 5 is an enlarged sectional view of another embodiment of the diaphragm-type air brake actuator and closing valve combination schematically shown in FIG. 1, with the valve in the open position.
Figure 6:
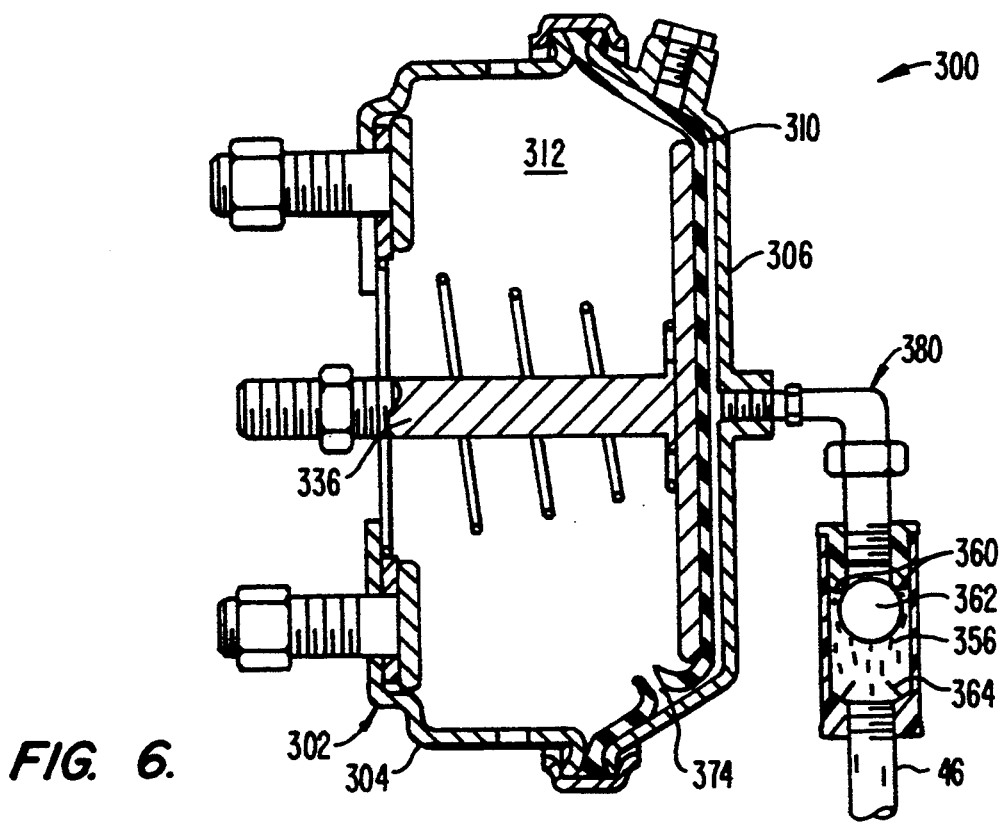
FIG. 6 shows the actuator and closing valve of FIG. 5 with the diaphragm ruptured and the valve in the closed position.

In the embodiment shown in FIGS. 2–4, the closing valve is integrally formed with the service brake chamber housing and, thus, is especially suited for the original equipment manufacturer (OEM) market. Referring to FIGS. 5 and 6, a further embodiment of the pneumatic brake actuator and closing valve, generally designated with reference numeral 300 is illustrated according to the present invention. This embodiment differs from that shown in FIGS. 2 and 3 in that closing valve 350 is not integrally formed with second cup-shaped portion 306 of housing 302, but is coupled to portion 306 through tubing 380. Thus, the embodiment of FIGS. 5 and 6 is especially suited for after-market installation where the closing valve is added to an existing service brake chamber. This embodiment also differs from that shown in FIGS. 2 and 3, in that valve body 352 comprises upper and lower threadably coupled portions 352a, b of which upper portion 352a forms cylindrical upper valve seat 360. Tubing 380 has a threaded portion 382 that cooperates with the inner threaded wall of outlet port 358 and a threaded portion 384 that cooperates with the internal threads of cylindrical portion 386 which is integrally formed with cup-shaped portion 306. The remaining elements of this embodiment are the same as those illustrated with respect to FIGS. 2–4, but are designated with 300 series numerals. Since actuator 300 also functions in the same manner as actuator 200, a description of the operation of this embodiment will not be made, to avoid unnecessary duplication.

The above is a detailed description of a particular embodiment of the invention. It is recognized that departures from the disclosed embodiment may be made within the scope of the invention and that obvious modifications will occur to a person skilled in the art. The full scope of the invention is set out in the claims that follow and their equivalents. Accordingly, the claims and specification should not be construed to unduly narrow the full scope of protection to which the invention is entitled.

What is claimed is:

1. A diaphragm-type vehicle brake actuator comprising:
    a housing having an interior and first and second portions, said first portion having an opening formed therethrough;
    a diaphragm positioned within said housing and arranged such that it divides the interior of said housing into first and second compartments, said diaphragm being coupled to said housing such that the diaphragm and housing form a fluid seal between said first and second compartments;
    an actuator member extending through the opening in said first portion and into said first compartment where the actuator member is coupled to and biased toward said diaphragm;
    a valve body defining a valve chamber and first and second ports and being integrally formed with said second portion, said first and second ports being fluidly coupled to one another through said valve chamber, said second port being fluidly coupled to said valve chamber and said second compartment, said first port further being adapted to be coupled to a source of pressurized fluid such that pressurized fluid can be introduced through said valve chamber and into said second compartment to displace the diaphragm and actuator member;
    first valve seat arranged adjacent said first port;
    second valve seat arranged adjacent said second port; and
    a valve element disposed in said valve chamber and being movable between a first position where the element is seated against said first seat and a second position where the valve element is seated against said second seat, said valve element being gravity biased toward said first position, whereby when pressurized fluid is introduced into the second compartment through the valve chamber and the diaphragm ruptures, the resultant increased flow rate of the fluid causes the valve element to move to the second position where it prevents pressurized fluid from entering the second port and being lost through the ruptured diaphragm.

2. The actuator of claim 1 wherein said diaphragm comprises polymeric material.

3. The actuator of claim 1 wherein said first valve seat is at an elevation substantially below said second valve seat.

4. The actuator of claim 1 wherein said first valve seat comprises a plurality of circumferentially spaced segments having apertures therebetween so that fluid flow through the first valve seat is permitted when the valve element is seated thereagainst.

5. The actuator of claim 4 wherein said valve element has a spherical configuration and a diameter less than the inner diameter of said valve chamber.

6. The actuator of claim 4 wherein said second valve seat includes a seating surface adjacent said second port, said seating surface being configured to form a seal with said valve element when said element is in said second position and seated against said seating surface such that fluid flow into said second port from said valve chamber is prevented.

7. A diaphragm-type vehicle brake actuator system comprising:
    a housing having an interior and first and second portions, said first portion having an opening formed therethrough and said second portion having an aperture;
    a diaphragm positioned within said housing and arranged such that it divides the interior of said housing into first and second compartments, said diaphragm being coupled to said housing such that a fluid seal is formed between said first and second compartments;
    an actuator member extending through the opening in said first portion and into said first compartment where the actuator member is coupled to and biased toward said diaphragm;
    a valve body defining a valve chamber and first and second ports, said first and second ports being fluidly coupled to one another through said valve chamber, said second port further being fluidly coupled to said second compartment through the aperture formed in said second portion, said first port further being adapted to be coupled to a source of pressurized fluid such that pressurized fluid can be introduced through said first port, valve chamber, second port, second portion aperture and into said second compartment to displace the diaphragm and actuator member; a first valve seat arranged adjacent said first port;
    a second valve seat arranged adjacent said second port; and
    a valve element disposed in said valve chamber and being movable between a first position where the element is seated against said first seat and a second position where the valve element is seated against said second seat, said valve element being gravity biased toward said first seat, whereby when fluid is introduced into the second compartment through the valve chamber and the diaphragm ruptures, the resultant increased flow rate of the fluid causes the valve element to move to the second position where it prevents pressurized fluid from entering the second port and being lost through the ruptured diaphragm.

8. The actuator system of claim 7 wherein said diaphragm comprises polymeric material.

9. The actuator system of claim 7 wherein said first valve seat is at an elevation substantially below said second valve seat.

10. The actuator system of claim 7 wherein said first valve seat comprises a plurality of circumferentially spaced segments having apertures therebetween so that fluid flow through the first valve seat is permitted when the valve element is seated thereagainst.

11. The actuator system of claim 10 wherein said valve element has a spherical configuration and a diameter less than the inner diameter of said valve chamber.

12. The actuator system of claim 10 wherein said second valve seat includes a seating surface adjacent said second port, said seating surface being configured to form a seal with said valve element when said element is in said second position and seated against said seating surface such that fluid is prevented from entering the second port from the valve chamber.

13. A diaphragm-type vehicle brake actuator comprising:
- a housing having an interior and first and second portions, said first portion having an opening formed therethrough and said second portion having an aperture;
- a diaphragm positioned within said housing and arranged such that it divides the interior of said housing into first and second compartments, said diaphragm being coupled to said housing such that the diaphragm and housing form a fluid seal between said first and second compartments;
- an actuator member extending through the opening in said first portion and into in said first compartment where the actuator member is coupled to and biased toward said diaphragm;
- a valve coupled to said housing, said valve defining a valve chamber and including first and second ports that are fluidly coupled through said valve chamber, said valve chamber and first and second ports defining a path, said second port being fluidly coupled to said second compartment, said first port adapted to be coupled to a source of pressurized fluid such that pressurized fluid can be introduced through said valve chamber and into said second compartment to displace the diaphragm and actuator member, said valve further including means for maintaining said path substantially open when fluid flow through said valve is at or below a first rate and sealing the path when fluid flow through the valve substantially exceeds said first rate.

14. The actuator of claim 13 wherein said valve is integrally formed with said second portion of the housing.

15. The actuator of claim 13 where said second port is at a substantially higher elevation that said first port and said valve chamber defines a generally vertical portion of said path.

16. The actuator of claim 13 wherein said means includes a valve element that is movable between said first and second ports.

* * * * *